June 20, 1972  D. G. SCOTT  3,671,086

EMPTY-LOAD CHANGEOVER APPARATUS

Filed Dec. 16, 1970  2 Sheets-Sheet 1

INVENTOR.
DANIEL G. SCOTT
BY Ralph W. McIntire

ATTORNEY

June 20, 1972  D. G. SCOTT  3,671,086
EMPTY-LOAD CHANGEOVER APPARATUS
Filed Dec. 16, 1970  2 Sheets-Sheet 2
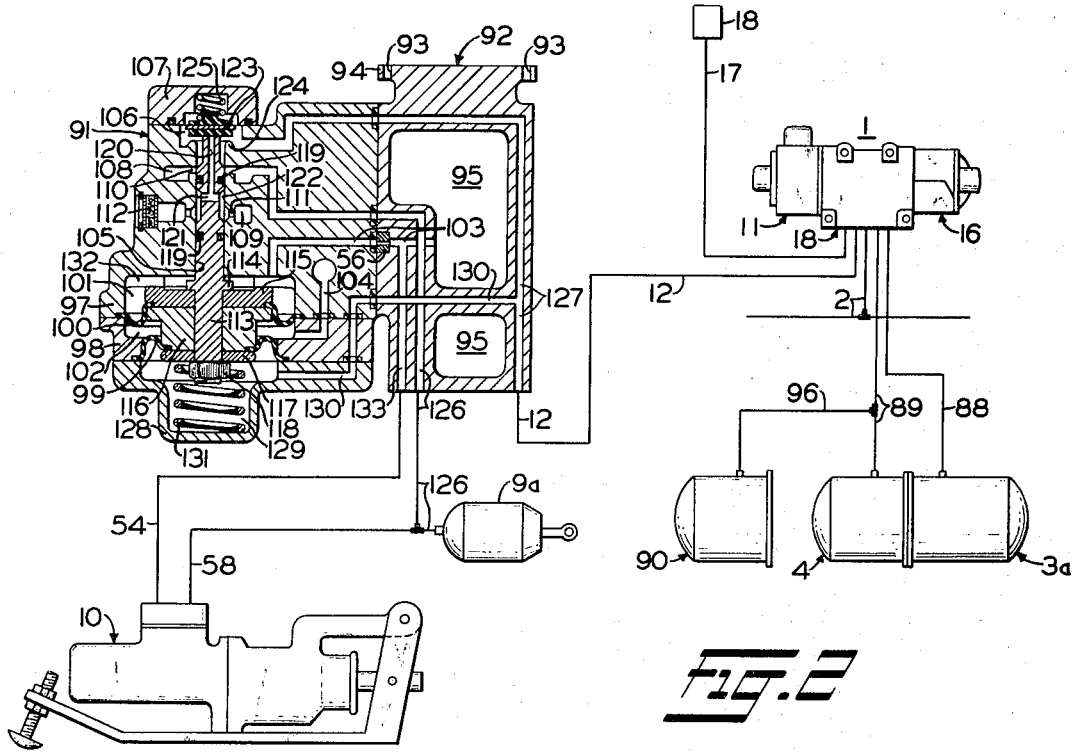
FIG.2
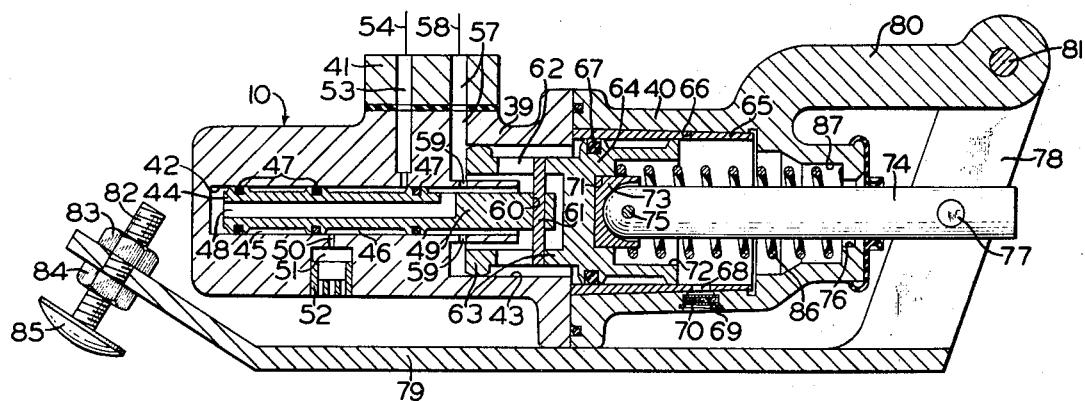
FIG.3
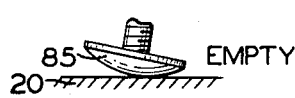
INVENTOR.
DANIEL G. SCOTT
BY Ralph W. McIntire Jr.
ATTORNEY

United States Patent Office

3,671,086
Patented June 20, 1972

3,671,086
EMPTY-LOAD CHANGEOVER APPARATUS
Daniel G. Scott, Apollo, Pa., assignor to Westinghouse Air Brake Company, Wilmerding, Pa.
Filed Dec. 16, 1970, Ser. No. 98,564
Int. Cl. B60t 8/18
U.S. Cl. 303—23 R                                                16 Claims

ABSTRACT OF THE DISCLOSURE

This invention relates to a brake cylinder pressure proportional valve device for interposition in a brake control pipe connecting a brake control valve and a brake cylinder and a novel mechanism adjustable accordingly as the vehicle is empty or loaded to cause the proportional valve device to operate only while the vehicle is empty and subsequent to a chosen build-up of an inshot pressure in the brake cylinder, to cut off flow of fluid under pressure from the brake control valve to the brake cylinder at a value proportional to the pressure established in the control pipe by the brake control valve for the reduction of pressure effected in the brake pipe.

BACKGROUND OF THE INVENTION

In the Pat. No. 3,612,621, issued Oct. 12, 1971 to Daniel G. Scott, and assigned to the assignee of the present application, there is shown and described a railway vehicle relay valve device that is mounted on a sprung part of the vehicle and includes a load-sensing mechanism that has a spool-type valve connected at one end to one side of an operating piston subject on its opposite side to fluid under pressure supplied from the brake cylinder port of a brake control valve and connected at its opposite end via a link or a slot to a pivoted load-sensing arm one end of which is rockable into contact with an unsprung part of the vehicle to thereby position the spool valve in a first position while the vehicle is empty and in a second position while it is loaded. The spool valve is provided with two longitudinal spaced-apart elongated peripheral annular grooves one of which carries a sliding O-ring seal which serves to control flow of fluid under pressure to one side of one of two abutments of the relay valve device. The length and location of these grooves are so selected as to accommodate a chosen amount of rocking of the load-sensing arm and corresponding movement of the spool valve, which is greater than that heretofore possible, without affecting either the supply of fluid under pressure to or the release of fluid under pressure from one side of one of the two abutments of the relay valve device to thereby render the one abutment either effective or ineffective to cooperate with the other abutment to control operation of the relay valve device in accordance with the difference in the effective area of the two abutments, or in accordance with the effective area of the other abutment. This rocking of the load-sensing arm produces excessive wear of the sliding O-ring seal.

Accordingly, it is the general purpose of this invention to provide a simple and inexpensive fluid pressure operated empty and load brake apparatus that includes a differential-type proportional valve device interposed between a brake control valve and a brake cylinder and a novel load-sensing mechanism in the form of a spool-type valve that has a lost-motion connection with a fluid pressure operated abutment which is operatively connected to a load-sensing arm. The longitudinal length of this lost-motion connection is so selected as to provide that the abutment, while the spool valve is in either its empty position or its full load position, may be moved a chosen distance in response to the rocking of the load-sensing arm effected by the shocks, jolts, vertical movement and sidewise rocking of a railway vehicle body, while the vehicle is traveling at a high speed, without causing shifting of the spool valve from whichever one of its two positions that it occupies to its other position to thereby cause the supply of fluid under pressure to or the release of fluid under pressure from one side of a differential-type abutment of the proportional valve device to render it effective or ineffective to cut off flow of fluid under pressure from the brake control valve to the brake cylinder.

SUMMARY OF INVENTION

According to the present invention, there is provided for use on railway vehicles that are normally operated either empty or fully loaded, a fluid pressure operated empty and load brake equipment that includes, in addition to the usual brake control valve and brake cylinder, a differential-type proportional valve device interposed in a conduit connecting the brake cylinder port of the control valve to the brake cylinder and a novel load-sensing mechanism operable only while the vehicle is empty and subsequent to a chosen build-up of an inshot pressure in the brake cylinder, to cause the proportional valve device to cut off flow of fluid under pressure from the brake control valve to the brake cylinder at a value proportional to the pressure established in the control pipe by the brake control valve for the reduction of pressure effected in the brake pipe. This load-sensing mechanism has a two-position spool-type valve which in one position connects the brake cylinder to the side of the differential abutment of the proportional valve device that has the larger effective area, and which in a second position connects this side of the differential abutment to atmosphere. This spool valve has a lost-motion connection with a piston in the form of a pin carried by a clevis integral with this valve and an elongated slot provided in a link integral with that side of the piston that is subject to fluid under pressure supplied to the brake cylinder. The other side of this piston is pivotally connected by means of a link to a pivoted load-sensing arm one end of which is rockable into contact with an unsprung part of the vehicle to thereby position the spool valve in a first position while the vehicle is empty and in a second position while it is loaded.

The length of the slot providing the lost-motion connection between the spool valve and the piston is so selected as to accommodate a chosen amount of rocking of the load-sensing arm and corresponding movement of the piston without effecting movement of the spool valve from either of its two positions. Consequently, this chosen amount of rocking of the load-sensing arm as the result of shocks, jolts and vertical and sidewise rocking of the vehicle body does not move the spool valve to cause an undesired supply of fluid under pressure to or from the proportional valve device.

In the accompanying drawings:

FIG. 2 is a diagrammatic view, in outline, showing an empty and load railway vehicle brake equipment constructed in accordance with a second embodiment of the invention, a relay valve device being included in this equipment in place of a proportional valve device and being shown in cross section.

FIG. 3 is a cross-sectional view on an enlarged scale of the load-sensing mechanism shown in outline in FIGS. 1 and 2.

Figure 1:
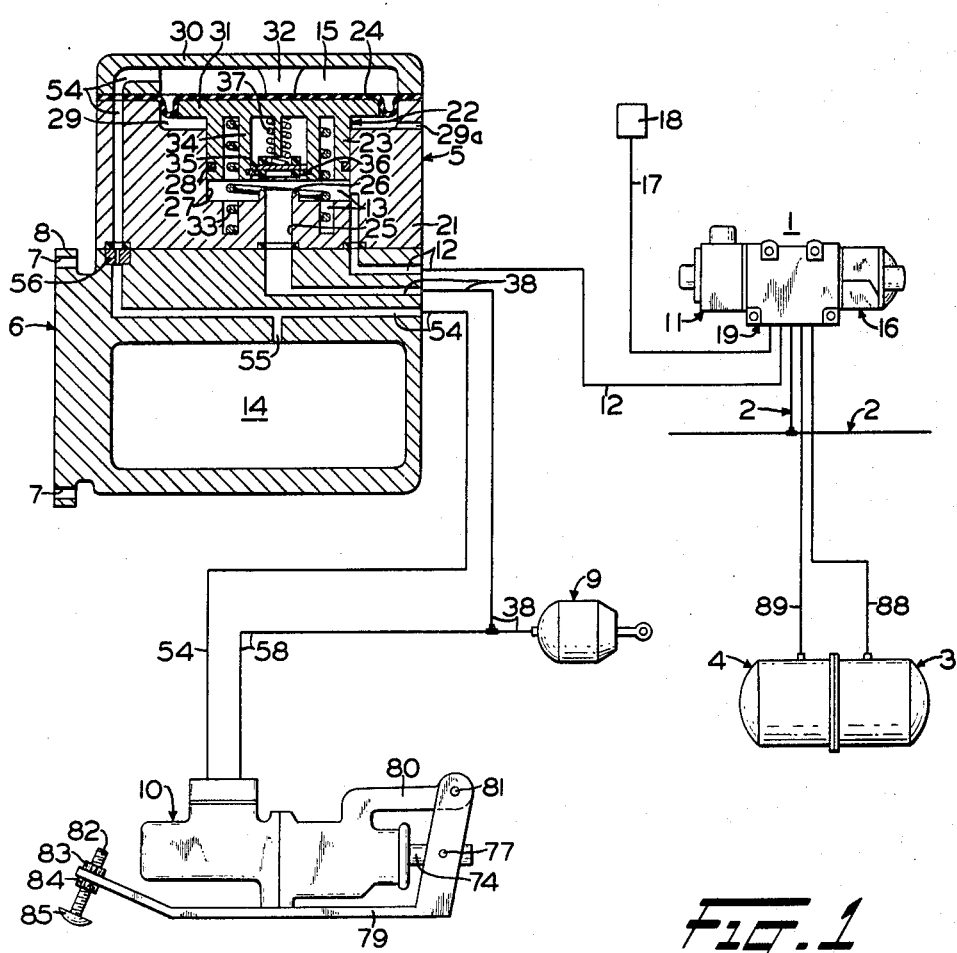
FIG. 1 is a diagrammatic view, in outline, showing an empty and load railway vehicle brake equipment constructed in accordance with a first embodiment of the invention, the proportional valve device included in this equipment being shown in cross section.

In FIG. 1 of the drawings, there is shown an empty and load fluid pressure brake equipment constructed in accordance with a first embodiment of the invention, it being understood that this brake equipment is suitable primarily for use on railway vehicles that are always operated while either empty or loaded to their maximum load-carrying capacity.

The empty and load fluid pressure brake equipment shown in FIG. 1 comprises a brake control valve 1 to which is connected the usual brake pipe 2, auxiliary reservoir 3, and emergency reservoir 4. The empty and load brake equipment shown in FIG. 1 further includes a differential-type proportional valve device 5 having a pipe bracket 6 that is mounted by means of a plurality of cap screws (not shown) extending through bores 7 in a flange 8 on a sprung part (not shown) of a railway vehicle, a brake cylinder 9, and a load-sensing mechanism 10.

The brake control valve 1 shown in FIG. 1 of the drawings is of the AB type which may be substantially the same operating characteristics as the brake control valve fully described in Pat. 2,031,213, issued Feb. 18, 1936, to Clyde C. Farmer, and assigned to the assignee of the present invention in view of which it is deemed unnecessary to show and describe this control valve in detail.

Briefly, however, the brake control valve 1 comprises a service portion 11 adapted to operate upon both a service and an emergency rate of reduction in pressure of fluid in brake pipe 2 for supplying fluid under pressure from the auxiliary reservoir 3 to a brake cylinder pipe 12 which is connected by a correspondingly numbered passageway to a chamber 13 in the proportional valve device 5. A volume reservoir 14 is provided in the pipe bracket 6 the purpose of this reservoir being to reduce the rate of build-up of pressure in a chamber 15 in the proportional valve device 5 and thereby prevent premature operation of this valve device to cut off flow of fluid under pressure to the brake cylinder 9 before the pressure therein is sufficient to provide the proper braking force on an empty vehicle.

The brake control valve 1 also comprises an emergency portion 16 which is adapted to operate only upon an emergency rate of reduction of pressure of fluid in the brake pipe 2 for supplying fluid under pressure from the emergency reservoir 4 to the pipe and passageway 12 and chamber 13. This fluid under pressure thus supplied from the emergency reservoir 4 to the pipe and passageway 12 and chamber 13, in addition to that provided in this pipe and passageway and chamber from the auxiliary reservoir 3 by operation of the service portion 11, is adapted to flow as controlled by operation of the proportional valve device 5 to the brake cylinder 9 to provide therein a higher pressure than is obtained when effecting a service brake application to cause an emergency brake application on the vehicle. Upon recharging the brake pipe 2, the brake control valve 1 is adapted to operate to open the pipe and passageway 12 to atmosphere via pipe 17 and a retaining valve device 18 in its direct exhaust position for releasing fluid under pressure from pipe 12 and chamber 13 to cause a release of fluid under pressure from the brake cylinder 9 in a manner hereinafter explained. Thus the brakes on the vehicle are released and at the same time this recharging of the brake pipe 2 effects the recharging of the auxiliary reservoir 3 and emergency reservoir 4 in the usual well-known manner. The service and emergency portions 11 and 16, respectively of the brake control valve 1 are mounted on the opposite faces of a pipe bracket 19 to which all pipe connections to the brake control valve 1 are made, as shown in FIG. 1 of the drawings.

It will be understood that all of the above-mentioned parts of the brake equipment are mounted on a suitable sprung part of the vehicle which sprung part is movable vertically relative to a stop 20 (FIG. 3) carried on an unsprung part of a railway vehicle which unsprung part may be, for example, as side frame of the vehicle truck.

The differential-type proportional valve device 5 comprises a casing 21 that is secured to the pipe bracket 6 by any suitable means (not shown) and a differential piston member 22 that includes an annular piston element 23 and a movable abutment or diaphragm 24.

The casing 21 is provided with a central bore 25 at the upper end of which is formed an annular valve seat 26 and with a coaxial counterbore 27 in which is slidably mounted the piston element 23. This piston element 23 has a peripheral annular groove in which is disposed an O-ring seal 28 that forms a seal with the wall surface of the counterbore 27 to prevent leakage from the chamber 13 to a chamber 29 formed by the cooperative relationship of the casing 21 and the diaphragm 24. The outer periphery of the diaphragm 24 is clamped between the casing 21 and a cover member 30 secured to the casing 21 by any suitable means (not shown).

The diaphragm 24 cooperates with the casing 21 and cover member 30 to form within the proportional valve device 5 and on the opposite sides of the diaphragm 23 the hereinbefore-mentioned chambers 29 and 15. The chamber 29 is open to atmosphere via a passageway 29a in the casing 21 and the chamber 15 is supplied with fluid under pressure in a manner hereinafter described.

The piston element 23 has formed integral with its upper end a diaphragm follower 31 that abuts the lower side of the diaphragm 24 which is normally biased against a stop 32 formed on the cover member 30 by a spring 33 that is disposed about an annular sleeve 34 integral with the piston element 23 and is interposed between this piston element 23 and the casing 21.

Carried within the annular sleeve 34 is a flat disc-type valve 35. This valve 35 is normally biased against a snap ring 36 that is inserted in a groove formed in the interior wall surface of the annular sleeve 34 by a spring 37 interposed between the valve 35 and the piston element 23.

While the spring 33 biases the piston element 23 and diaphragm 24 to the position shown in FIG. 1 in which the diaphragm 24 abuts the stop 32 and the spring 37 biases the valve 35 against the snap ring 36, the valve 35 is unseated from the valve seat 26 so that the chamber 13 is in communication with the brake cylinder 9 via the bore 25 in the casing 21 and a passageway 38 extending through the pipe bracket 6 and connected to the brake cylinder 9 by a correspondingly numbered pipe.

The hereinbefore-mentioned load-sensing mechanism 10, as shown in detail in FIG. 3 of the drawings, comprises a sectionalized casing having two casing sections 39 and 40 secured together by any suitable means (not shown). The casing section 39 in turn is secured to a pipe bracket 41 that is carried on the body of the vehicle and to which bracket all pipe connections are made. The casing section 39 is provided with a bottomed bore 42 and a coaxial counterbore 43 that extend inward from its right-hand end.

The bottomed bore 42 has slidably mounted therein a spool valve 44 that has formed thereon two spaced-apart elongated peripheral annular grooves 45 and 46 of unequal length. The spool valve 44 carries in three peripheral annular grooves thereon, one between the elongated grooves 45 and 46 and one adjacent the outer end of each of these grooves, three O-ring seals 47 for preventing leakage of fluid under pressure along the wall surface of the bore 42.

In order to balance the spool valve 44 by subjecting its opposite ends to the same pressure, this valve is provided with a central passageway 48 that at one end opens at the left-hand end of this spool valve and at its other end opens at the peripheral surface of a stem 49 that is integral with the right-hand end of this spool valve 44.

While the spool valve 44 occupies the position shown in FIG. 3, it can be seen that opening at the wall surface of the bore 42 adjacent the left-hand end of the elongated groove 46 on this spool valve is one end of a short passageway 50 that at its other end opens into a chamber 51 that is open to atmosphere via an insect excluder device 52 that is carried by the casing section 39. Furthermore, while the spool valve 44 occupies the position shown in FIG. 3, it can be seen that opening at the wall surface of the bottomed bore 42 adjacent the right-hand end of the elongated groove 46 is one end of a passageway 53 that extends through the casing section 39 and the pipe bracket 41 to the top of this pipe bracket. In the first embodiment of the present invention, as shown in FIG. 1 of the drawings, one end of a pipe 54 is connected to the passageway 53 in the pipe bracket 41 and the other end of this pipe is connected by a correspondingly numbered passageway extending through the pipe bracket 6, casing 21 and cover member 30 to the chamber 15 in the proportional valve device 5. A short passageway 55 opens at one end into the passageway 54 in the pipe bracket 6 and at its opposite end into the herein-before-mentioned volume reservoir 14 in this pipe bracket. A choke 56 is disposed in the upper left-hand end of the passageway 54 in the pipe bracket 6 and serves to control the rate of flow of fluid under pressure to or the rate of build-up of pressure in the chamber 15 in the proportional valve device 5.

As shown in FIG. 3, opening into the left-hand end of the counterbore 43 in the casing section 39 is one end of a passageway 57 that extends through this casing section and the pipe bracket 41 to the top of this bracket. In the first embodiment of the invention, as shown in FIG. 1, one end of a pipe 58 is connected to the passageway 57 in the pipe bracket 41 and the other end is connected to the pipe 38 intermediate the ends thereof.

In order for the elongated groove 46 on the spool valve 44 to establish a communication between the passageways 53 and 57 while this spool valve 44 occupies the position to which it is moved upon effecting a brake application on an empty vehicle, the casing section 39 is provided with a plurality of arcuately spaced drilled holes or ports 59 which open at one end at the wall surface of the bottomed bore 42 and at the other end into the interior of the counterbore 43.

Adjacent its right-hand end, the stem 49 is provided with a bore 60 into which is press-fitted a pin 61 the opposite ends of which extend into an elongated slot 62 provided in a hollow boss 63 that is integral with the left-hand face of a piston 64. This piston is slidably disposed in a bushing 65 that is press-fitted into a counterbore 66 extending inward from the left-hand end of the casing section 40.

The piston 64 is provided with a peripheral annular groove in which is disposed an O-ring seal 67 which prevents leakage of fluid under pressure from the interior of the counterbore 43 to the interior of the bushing 65 at the righthand side of this piston it being noted that this interior portion of the bushing 65 is open to atmosphere via a port 68 in the bushing and a suitable air strainer or filter device 69 that is disposed in a bore 70 provided in the casing section 40.

Extending inward from the right-hand end of the piston 64 is a bottomed bore 71 and a coaxial counterbore 72. Press-fitted into the bottomed bore 71 is a cup-shaped member 73 to which one end of a piston rod 74 is pivotally connected by means of a pin 75 extending through the piston rod 74 and having its opposite ends anchored in this member 73. The piston rod 74 extends through a bore 76 in the casing section 40 and has its right-hand end pivotally connected by a pin 77 to a clevis 78 in the opposite jaws of which the ends of the pin 77 are anchored intermediate the ends of these jaws, it being noted that only one of these jaws appears in FIG. 3.

The clevis 78 is formed at one end of a load-sensing lever 79 which is pivotally mounted on an arm 80 that is integral with the casing section 40 by a pin 81 that extends through a bore provided in the arm 80 and has its opposite ends anchored in the jaws of this clevis adjacent the upper end of these jaws.

Adjacent its left-hand end, the lever 79 is provided with a screw-threaded bore which receives a screw-threaded stem 82 that carries two lock nuts 83 and 84 that provide for adjusting the stem 82 with respect to the lever 79 and then locking it in its adjusted position. By adjusting the position of the stem 82, the lower end of which is provided with a foot 85 that is rockable, in a manner hereinafter explained, into abutting relationship with the stop 20 carried by the unsprung truck side frame, the empty and load brake apparatus constituting the first embodiment of the invention can be adapted for use on railway vehicles having different spring deflections.

The piston 64, spool valve 44 and lever 79 are normally biased to the position shown in FIG. 3 in which the lever 79 abuts the bottom of the casing sections 39 and 40 by a light spring 86 that is disposed in surrounding relation to the piston rod 74 and interposed between the piston 64 and the right-hand end of a counterbore 87 that is coaxial with the bore 76 in the casing section 40.

OPERATION—FIG. 1

Initial charging

In initial charging the empty and load brake equipment shown in FIG. 1 of the drawings, fluid under pressure supplied to the brake pipe 2 by the usual brake valve (not shown) on the locomotive flows to the brake control valve device 1 and thence through this device and a pipe 88 connected to the auxiliary reservoir 3 and a pipe 89 connected to the emergency reservoir 4, respectively, to effect charging of these reservoirs in the usual well-known manner.

It will be understood that at this time the brake cylinder 9 and the various chambers in the proportional valve device 5 and the load-sensing mechanism 10 are devoid of fluid under pressure.

Service application of the brakes on an empty vehicle

When it is desired to effect a service brake application, the pressure in the brake pipe 2 will be reduced in the usual well-known manner, by operation of the brake valve on the locomotive, an amount corresponding to the degree of brake application desired. This reduction of the pressure in the brake pipe 2 causes the service portion 11 of the brake control valve 1 to effect the supply of fluid under pressure from the auxiliary reservoir 3 to the pipe 12 which is connected by the correspondingly numbered passageway to the chamber 13 in the proportional valve device 5. Since the valve 35 occupies the position shown in FIG. 1 in which it is unseated from its seat 26, fluid under pressure supplied to the chamber 13 will flow therefrom to the brake cylinder 9 via the bore 25 and passageway and pipe 38.

Some of the fluid under pressure supplied to the pipe 38 in the manner just described will flow to the interior of the counterbore 43 (FIG. 3) in the load-sensing mechanism 10 via the pipe 58 and passageway 57. Since the interior of the counterbore 43 is connected to the left-hand end of the bottomed bore 42 by the passageway 48 in the spool valve 44, it is apparent that fluid under pressure is simultaneously supplied to the opposite ends of the spool valve 44 thereby ballancing the fluid pressure forces acting thereon so that this valve will remain in the position shown until the fluid under pressure present in the interior of counterbore 43 and acting on the left-hand face of the piston 64 moves this piston and the piston rod 74 in the direction of the right-hand against the yielding resistance of the spring 86 until the left-hand end of the elongated slot 62 in the hollow boss 63 abuts the pin 61. This movement of the piston 64 and piston rod 74 in the direction of the right hand against the yielding resistance of spring 86 is effective via the pin 77 and clevis 78 to rock the lever 79 counterclockwise about the pin 81. Since the vehicle may be assumed to be empty, the foot 85 is at a maximum distance from the stop 20. Therefore, subsequent to movement of the piston 64 and hollow boss 63 to the position in which the pin 61 abuts the left-hand end of the slot 62, the piston 64 and piston rod 74 will continue to move in the direction of the right-hand and simultaneously move the spool valve 44 in this direction until the foot 85 is moved into abutting relationship with the stop 20. As the piston 64, piston rod 74 and spool valve 44 are thus moved in the direction of the right hand, the O-ring seal 47 carried by the spool valve 44 adjacent the right-hand end of the groove 46 is moved past the location of the ports 59 in the casing section 39 and likewise, the O-ring seal 47 adjacent the left-hand end of the groove 46 is moved past the location at which the passageway 50 opens at the wall surface of bottomed bore 42 it being noted, however, that the foot 85 is moved into abutting relationship with the stop 20 prior to movement of the O-ring seal 47 adjacent the left-hand end of the groove 45 on the spool valve 49 past the location at which one end of the passageway 50 opens at the wall surface of the bottomed bore 42. Accordingly, as soon as the O-ring seal 47 adjacent the right-hand end of the groove 46 is moved past the ports 59 in the casing section 39, the fluid under pressure present in the passageway 57 and interior of counterbore 43 will flow therefrom to the chamber 15 in the proportional valve device 5 via the ports 59, groove 46, passageway 53, pipe and passageway 54 and choke 56 therein. Since the volume reservoir 14 is connected to the passageway 54 by the short passageway 55, some of the fluid under pressure supplied to the passageway 54 will also flow to the volume reservoir 14.

It will be understood from the foregoing that the fluid under pressure supplied from the auxiliary reservoir 3 to the brake control pipe 12 by operation of the service portion 11 of the brake control valve 1 flows to the chamber 13 and the brake cylinder 9 and thence to the volume reservoir 14 and chamber 15, the size of the choke 56 controlling the rate of flow of fluid under pressure to the chamber 15. The effective area of the diaphragm 24 is greater than the effective area of the piston member 23. Consequently, the fluid under pressure present in the chamber 15 acts on a greater area than the fluid under pressure present in the chamber 13. Therefore, the fluid pressure force acting downward on the differential piston member 22 will increase more rapidly than the fluid pressure force acting upward on this piston member. Accordingly, for a given pressure present in the chamber 13, a lesser pressure, depending on the area of the piston element 23 and the effective area of the diaphragm 24, present in the chamber 15 will establish a fluid pressure force acting in a downward direction that exceeds the fluid pressure force acting in an upward direction as the result of the above-mentioned given pressure in the chamber 13, and, if the pressure present in the chamber 13 remained constant, the differential piston member 22 would move downward until the valve 35 was seated on the valve seat 26 which would cut off further flow of fluid under pressure to the brake cylinder 9, volume reservoir 14 and chamber 15. However, the pressure in the chamber 13 is increasing and continues to increase until the pressure in the pipe and passageway 12 and the chamber 13 corresponds to the degree of reduction of pressure effected in the brake pipe 2. This increasing pressure in the chamber 13 is effective to correspondingly increase the fluid pressure force acting upward on the differential piston member 22. Therefore, this increasing fluid pressure force acting upward on the differential piston member 22 maintains it in its upper position shown in FIG. 1 in which valve 35 is unseated from valve seat 36 so that fluid under pressure can continue to flow to chamber 15. Accordingly, the pressure in the pipe 12 and chamber 13 will increase until it reaches a value corresponding to the reduction of pressure effected in the brake pipe 2.

Since the valve 35 is unseated from its seat 26, fluid under pressure will flow from the chamber 13 to the brake cylinder 9, volume reservoir 14 and chamber 15 until the pressure of the fluid present in the chamber 15 and acting downward on the effective area of the diaphragm 24 establishes a fluid pressure force that slightly exceeds the fluid pressure force acting in an upward direction on the piston element 23 as the result of a greater degree of pressure present in the chamber 13 it being noted that the pressure in this chamber 13 corresponds to the reduction of pressure effected in the brake pipe 2, as stated above. Consequently, subsequent to the build-up of pressure in the chamber 13 to the value corresponding to the degree of reduction of pressure effected in the brake pipe 2, a lesser pressure established in the brake cylinder 9, volume reservoir 14 and chamber 15 will move the differential piston member 22 downward until the valve 35 is seated on its seat 26 thereby cutting off further flow of fluid under pressure from the brake cylinder pipe 12 to the brake cylinder 9, volume reservoir 14 and chamber 15.

If now a greater degree of pressure is desired in the brake cylinder 9, a further reduction of pressure in the brake pipe 2 is effected by operation of the brake valve on the locomotive until the pressure in the brake pipe 2 is decreased an amount corresponding to the degree of brake application desired.

The brake control valve 1 operates in response to this further reduction of pressure in the brake pipe 2 to effect the supply of fluid under pressure from the auxiliary reservoir 3 to the pipe 12 and chamber 13 to increase the pressure therein an amount corresponding to the further reduction of pressure effected in the brake pipe. As the pressure in the chamber 13 is thus increased, the proportional valve device 5 will operate in the same manner as hereinbefore described to effect a further increase of pressure in the brake cylinder 9 to a value proportionally less than that established in the pipe 12 by operation of the service portion 11 of the brake control valve 1.

From the foregoing, it is apparent that as the pressure in the brake pipe 2 is decreased to that required to normally effect a full service brake application, the proportional valve device 5 operates to effect a corresponding increase in the pressure obtained in the brake cylinder 9 which pressure is less than that established in the pipe and passageway 12 and chamber 13 by operation of the service portion 11 of the brake control valve 1 by an amount dependent on the difference in the effective area of the diaphragm 24 and the area of the piston element 23.

Accordingly, it will be understood that by the proper selection of the capacity of the volume reservoir 14, the area of the piston element 23 and the effective area of the diaphragm 24, the differential piston member 22 will move downward to effect seating of the valve 35 on the valve seat 26 upon the pressure in the brake cylinder 9 reaching the value required to provide a braking force that is adequate to brake an empty vehicle.

As has been stated above, while the brakes are applied on an empty vehicle, the pin 61 (FIG. 3) abuts the left-hand end of the elongated slot 62 in the hollow boss 63 and the spool valve 44 occupies a position in which the elongated groove 46 thereon establishes a communication between the passageways 57 and 53 via the ports 59 in the casing section 39 and groove 46 on spool valve 44.

Furthermore, while the brakes are applied, the foot 85 is in abutting relationship with the stop 20, as aforestated.

Accordingly, should any relative movement between the sprung and unsprung parts of the railway vehicle now occur as the result of shocks, jolts, verticle movement or sidewise rocking of the sprung part, that is the vehicle body, while the train is traveling at a high speed, it is apparent that the lever 79 will be rocked counterclockwise about the pin 81 by fluid under pressure present in the counterbore 43 and acting on the left-hand side of the piston 64 should this movement be such as to increase the distance between the sprung and unsprung parts, or the lever 79 will be rocked clockwise about the pin 81 in opposition to this fluid under pressure acting on the left-hand side of piston 64 should this movement be such as to decrease the distance between the sprung and unsprung parts of the vehicle. Therefore, it is apparent that a limited amount of either counterclockwise or clockwise rocking of the lever 79 can occur in response to shocks, jolts, etc. without the spool valve 44 being moved in the direction of the right hand to the position in which the O-ring seal 47 carried thereon adjacent the left-hand end of the groove 46 forms a seal with the wall surface of the bottomed bore 42 at a location on the right-hand side of the location at which the end of the passageway 53 opens at the wall surface of bottomed bore 42, or without the piston 64 and hollow boss 63 integral therewith being moved in the direction of the left hand beyond the position in which the pin 61 abuts the right-hand end of the elongated slot 62 in this hollow boss 63 which movement of the spool valve 44 in this direction to a position in which the O-ring seal 47 carried thereon adjacent the right-hand end of the groove 46 forms a seal with the wall surface of the bottomed bore 42 at a location on the left-hand side of the ports 59 in the casing section 39.

Should the spool valve 44 be moved to the first of the two above-mentioned positions, the flow of fluid under pressure from the passageway 57 to the passageway 53 and thence to the volume reservoir 14 and chamber 15 in the proportional valve device 5 would be terminated.

Likewise, should the spool valve 46 be moved to the second of the two above-mentioned positions, the flow of fluid under pressure from the passageway 57 to the passageway 53 and thence to the volume reservoir 14 and chamber 15 would be terminated. It is apparent that if the flow of fluid under pressure to the chamber 15 in the proportional valve device 5 is terminated, this valve device will not operate to proportion the pressure obtained in the brake cylinder 9 upon effecting a brake application while the vehicle is empty. Consequently, an excessive braking force on the empty vehicle would be obtained which excessive braking force could possibly result in flat spots on the tread of the vehicle wheels.

It is apparent from the foregoing that the length of the elongated slot 62 (FIG. 3) and the location of the two O-ring seals 47 adjacent the opposite ends of the groove 46 on the spool valve 44 may be so selected and arranged as to provide for a limited amount of clockwise or counterclockwise rocking of the lever 79 about the pin 81 in response to shocks, jolts, vertical movement and sidewise rocking of the body of the railway vehicle relative to the vehicle truck frame without rendering the proportional valve device 5 inoperative to proportion the pressure obtained in the brake cylinder 9 upon effecting a brake application while the vehicle is empty.

Release of a service application on an empty vehicle

When it is desired to effect a release of a service brake application, the pressure in the brake pipe 2 will be increased in the usual manner to cause the service slide valve (not shown) of the service portion 11 of the brake control valve 1 to be returned to its release position so that a communication is established therethrough from the chamber 13 in the proportional valve device 5 to atmosphere via the pipe 17 and retaining valve device 18 which it may be assumed occupies its direct exhaust position. Consequently, all of the fluid under pressure in the chamber 13 will be vented to atmosphere.

As fluid under pressure is vented from the chamber 13, it is likewise vented from the upper side of the flat disc-type check valve 35 which is seated on its seat 26. Consequently, as fluid under pressure is vented from the chamber 13 and the upper side of the valve 35, the fluid under pressure present in the bore 25, pipe and passageway 38, brake cylinder 9, volume reservoir 14 and chamber 15 will move the valve 35 upward from its seat 26 against the yielding resistance of the spring 37 it being noted that the pressure in the chamber 15 and acting in a downward direction on the effective area of the diaphragm 24 maintains the differential piston member 22 in its lower position upon the initial unseating of the valve 35 from its seat 26. Upon unseating of the valve 35 from its seat 26 in the manner just explained, fluid under pressure in the chamber 15, volume reservoir 14 and brake cylinder 9 will be vented to atmosphere via chamber 13, passageway and pipe 12, the service slide valve of the service portion 11, pipe 17 and retaining valve device 18.

When the pressure in the chamber 15 is reduced to a value such that this pressure acting in a downward direction on the effective area of the diaphragm 24 is no longer able to establish a fluid pressure force in excess of the force of the spring 33, this spring will move the differential piston element 22 upward to the position shown in FIG. 1. In this position of the differential piston element 22, all fluid under pressure is vented from the brake cylinder 9, volume reservoir 14 and chamber 15 to atmosphere since the spring 37 biases the valve 35 against the snap ring 36 and this valve is unseated from its seat 26. Consequently, the brakes on the empty vehicle are completely released.

Since fluid under pressure is released from the interior of the counterbore 43 (FIG. 3) simultaneously as fluid under pressure is released from the chamber 15 and volume reservoir 14, the spring 86 is rendered effective to move the piston 64 and piston rod 74 in the direction of the left hand to the position shown in FIG. 3, it being noted that subsequent to the piston 64 moving a distance substantially equal to the length of the elongated slot 62 in the hollow boss 63, the pin 61 abuts the right-hand end of this slot 62 so that continued movement of the piston 64 in the direction of the left hand is effective to move the spool valve 44 in this direction to the position it is shown in FIG. 3.

As the piston 64 and piston rod 74 are thus moved in the direction of the left hand to the position shown in FIG. 3, it is apparent that the lever 79 is simultaneously rocked clockwise about the pin 81 from the position in which the foot 85 abuts the stop 20 to the position in which the lever 79 and foot 85 are shown in FIG. 3 it being noted that the lever 79 abuts the bottom of the casing sections 39 and 40 thereby determining the position to which the piston 64 is moved by the spring 86.

As the pressure in the brake pipe 2 is charged to the normal fully charged pressure carried therein, fluid under pressure will flow from the brake pipe 2 via the brake control valve device 1 to the auxiliary reservoir 3 and the emergency reservoir 4 to charge these reservoirs until the pressure therein is substantially the same as that in the brake pipe 2.

Service application of the brakes on a loaded vehicle

Let it be supposed that the brake equipment shown in FIG. 1 has been charged in the manner hereinbefore described and that the vehicle is fully loaded.

The load on the vehicle is effective to compress the springs of the vehicle truck so that the sprung part that carries the load-sensing mechanism 10 is moved downward from the position it occupied while the vehicle was empty a distance proportional to the load carried by the vehicle. Consequently, the distance between the foot 85 and the stop 20 (FIG. 3) will decrease as the load on the body or sprung part of the vehicle is increased.

When a service brake application is effected in the manner hereinbefore described and fluid under pressure is supplied to the pipe and passageway 12 and thence to the brake cylinder 9 and the interior of counterbore 43 (FIG. 3) via the chamber 13, bore 25, passageway and pipe 38, pipe 58 and passageway 57, it will act on the left-hand face of the piston 64 to move this piston and the piston rod 74 in the direction of the right hand and effect counterclockwise rocking of the lever 79 about the pin 81 until the foot 85 is moved into abutting relationship with the stop 20.

The length of the elongated slot 62 in the hollow boss 63 which is integral with piston 64 is so selected that, while the vehicle is fully loaded, the foot 85 will be moved into abutting relationship with stop 20 simultaneously as the left-hand end of this slot 62 is moved into abutting relationship with the pin 61. Consequently, the spool valve 44 is not moved from the position shown in FIG. 3 at this time.

From the foregoing, it is apparent that the passageway 57 remains cut off from the passageway 53, and the chamber 15 (FIG. 1) and volume reservoir 14 remain open to atmosphere via passageway and pipe 54, chocke 56, passageway 55, passageway 53 (FIG. 3), elongated groove 46 on spool valve 44, passageway 50, chamber 51 and insect excluder device 52. Consequently, the proportional valve device 5 is inoperative to proportion flow of fluid under pressure to the brake cylinder 9 to control the build-up of pressure therein. Therefore, fluid under pressure will flow from the pipe 12 to the brake cylinder 9 until the service slide valve of the service portion 11 of brake control valve 1 is moved to its lap position in the usual manner to cut off flow of fluid under pressure from the auxiliary reservoir 3 to the brake cylinder 9. Accordingly, it is apparent that the pressure obtained in the brake cylinder 9 corresponds to the reduction of pressure effected in the brake pipe 2 and that a greater braking force is provided for the vehicle while loaded than is provided for it while empty.

As has been hereinbefore stated, while the brakes are applied on a fully loaded vehicle, the spool valve 44 occupies the position shown in FIG. 3 and the piston 64 occupies a position to the right of that shown in which position the left-hand end of the elongated slot 62 abuts the pin 61.

Furthermore, while the brakes are applied the foot 85 is in abutting relationship with the stop 20, as stated above.

Accordingly, should any relative movement between the sprung and unsprung parts of the railway vehicle now occur as the result of shocks, jolts, vertical movement or sidewise rocking of the sprung part of the vehicle body relative to the unsprung truck side frame while the train is traveling at high speed, it is apparent that the lever 79 will be rocked counterclockwise about the pin 81 by the fluid under pressure in the counterbore 43 and acting on the left-hand face of the piston 64 should this movement be such as to increase the distance between the sprung and unsprung parts of the vehicle. Therefore, it is apparent that a limited amount of counterclockwise rocking of the lever 79 can occur in response to shocks, jolts, etc. without the piston 64 moving the spool valve 44 in the direction of the right hand from the position shown in FIG. 3 to the position in which the O-ring seal 47 adjacent the right-hand end of the groove 46 on this spool valve forms a seal with the wall surface of the bottomed bore 42 on the right-hand side of the ports 59 and thereby opening a communication between the passageways 57 and 53 so that fluid under pressure could flow to the chamber 15 in the proportional valve device 5 whereupon this valve device would be operated to close communication between the pipe and passageway 12 and the brake cylinder 9. Were this communication thus closed, prior to the pressure in the brake cylinder 9 building up to a value corresponding to the reduction of pressure effective in the brake pipe 2, it is apparent that the braking force obtained would be inadequate to properly brake the now loaded vehicle.

Furthermore, it is apparent that a limited amount of additional clockwise rocking of the lever 79 can occur, subsequent to movement of the piston 64 in the direction of the left hand against the fluid under pressure present in the counterbore 43 to the position in which this piston is shown in FIG. 3, without this piston moving the spool valve 44 from the position shown in FIG. 3 in the direction of the left hand to the position in which the O-ring seal 47 adjacent the right-hand end of the groove 46 makes a seal with the wall surface of the bottomed bore 42 on the left-hand side of the location at which the end of the passageway 53 opens at this wall surface and thereby opening a communication between the passageways 57 and 53 so that fluid under pressure could flow to the chamber 15 in the proportional valve device 5 whereupon this valve device would operate to cut off further flow of fluid under pressure to the brake cylinder 9. Of course operation on the proportional valve device 5 to cut off flow of fluid under pressure to the brake cylinder 9 upon effecting a brake application while the vehicle is fully loaded is undesirable.

Release of a service application of brakes on a loaded vehicle

To release a service brake application on a fully loaded vehicle, the pressure in the brake pipe 2 is increased to its normal charged value to cause the service slide valve of the service portion 11 of the brake control valve 1 to return to its release position whereupon all fluid under pressure in the brake cylinder 9 and counterbore 43 (FIG. 3) in the loading sensing mechanism 10 is vented to atmosphere via passageway 57, pipe 58, pipe and passageway 38, bore 25, chamber 13, passageway and pipe 12, the service slide valve now in its release position, pipe 17 and retaining valve device 18 which may be assumed now occupies its direct exhaust position. This release of all fluid under pressure from the brake cylinder 9 causes a release of the service brake application on the loaded vehicle.

Emergency application and release of brakes

An emergency brake application on both an empty and a loaded vehicle differs from a service brake application only in that when an emergency brake application is effected, fluid under pressure is supplied from both the auxiliary reservoir 3 and the emergency reservoir 4 to the brake cylinder 9 while the vehicle is loaded, and to the brake cylinder 9, the volume reservoir 14 and the chamber 15 in the proportional valve device 5 while the vehicle is empty. By supplying fluid under pressure from both the auxiliary reservoir 3 and the emergency reservoir 4, a higher equalization pressure is obtained in the brake cylinder 9 while the vehicle is loaded, and, while the vehicle is empty, a higher equalization pressure is obtained in chamber 13 of the proportional valve device 5.

The size of the choke 56 is so selected that prior to downward movement of the differential piston member 22 and seating of valve 35 on its seat 26, this choke prevents too rapid a build-up of pressure in the chamber 15 which would cause premature operation of the proportional valve device 5 to cut off further flow of fluid under pressure to brake cylinder 9.

It should be understood that the proportional valve device 5 operates in response to the establishment of the higher pressure in the pipe and passageway 12 by the supply of fluid under pressure thereto from both the auxiliary reservoir 3 and the emergency reservoir 4 to establish, upon effecting an emergency brake application while the vehicle is empty, a corresponding lower pressure in the brake cylinder 9 which pressure is higher than the pressure obtained in this brake cylinder upon effecting a service brake application while the vehicle is empty. This higher braking pressure in the pressure chamber of the brake cylinder 9 causes a higher braking force to be transmitted by this brake cylinder 9 to the brake shoes (not shown) for pressing the brake shoes against the tread surface of the vehicle wheels.

DESCRIPTION—FIG. 2

In FIG. 2 of the drawings, there is shown an empty and load fluid pressure brake equipment constructed in accordance with a second embodiment of the invention. According to this second embodiment of the invention, the empty and load fluid pressure brake equipment shown in FIG. 2 differs from that shown in FIG. 1 in that an oversize auxiliary reservoir 3a is used in place of the standard size auxiliary reservoir 3, a second emergency reservoir 90 is connected to the usual emergency reservoir 4 shown in FIG. 1 to provide an oversize emergency reservoir and in that the proportional valve device 5 shown in FIG. 1 is replaced by a change-over valve device 91 that operates to limit the brake cylinder pressure obtained upon effecting a brake application while the vehicle is empty. The change-over valve device 91 is secured to the left-hand side of a pipe bracket 92 that is mounted by means of a plurality of cap screws (not shown) extending through bores 93 in a flange 94 on a sprung part (not shown) of a railway vehicle. Like the pipe bracket 6 shown in FIG. 1, the pipe bracket 92 has provided therein a volume reservoir 95 which serves the same purpose as the volume reservoir 14 in the pipe bracket 6. Accordingly, like reference numerals have been used to designate the structure shown in FIG. 2 which is identical to that shown in FIG. 1. Only such features of the structure and operation of the embodiment of the invention shown in FIG. 2 which are different than that of the embodiment of FIG. 1 will be hereinafter described.

According to the second embodiment of the invention disclosed in FIG. 2, this empty and load fluid pressure brake equipment comprises the well-known AB type brake control valve 1 to which is connected the usual brake pipe 2, oversize auxiliary reservoir 3a, emergency reservoir 4 and the second emergency reservoir 90 which is connected to the pipe 89 intermediate its ends by a pipe 96. The empty and load fluid pressure brake equipment shown in FIG. 2 further includes the load-sensing mechanism 10 and one or more brake cylinders 9a that has a larger volume than the brake cylinder 9 shown in FIG. 1.

The change-over valve device 91 is of the double-diaphragm self-lapping type and comprises, as shown in FIG. 2, a sectionalized casing embodying two casing sections 97 and 98 and two coaxially arranged movable abutments or diaphragms 99 and 100 of unequal effective area. The outer periphery of the larger diaphragm 100 is clamped between the casing sections 97 and 98 which are secured together by any suitable means (not shown).

The diaphragm 100 cooperates with the casing sections 97 and 98 and the diaphragm 99 to form within the change-over valve device 91 and on the opposite sides of the diaphragm 100, a pair of chambers 101 and 102, the former being connected to the volume reservoir 95 by a passageway 103 extending through the casing section 97 and the pipe bracket 92 and the latter being open to atmosphere via a passageway 104 extending through the casing sections 98 and 97 and opening at the exterior surface of casing section 97.

The casing section 97 of the above-mentioned sectionalized casing of the change-over valve device 97 is provided with a bore 105 that at its upper end opens into a chamber 106 formed by the cooperative relationship between the upper end of the casing section 97 and a cover member 107 secured to the casing section 97 by any suitable means (not shown). The opposite or lower end of the bore 105 opens into the chamber 101, and intermediate its ends this bore 105 opens respectively, into two spaced-apart annular chambers 108 and 109 formed in the casing section 97 via two sets of arcuately spaced ports 110 and 111. The chamber 109 is open to atmosphere via a strainer device 112 carried by casing section 97. Slidably mounted in the bore 105 is a valve stem 113 having intermediate its ends a collar 114 and adjacent its lower end a screw-threaded portion.

The upper portion of the stem 113 below the collar 114 extends through an annular diaphragm follower plate 115 and an annular diaphragm follower 116 between which plate and follower the inner periphery of the diaphragm 100 is clamped to operatively connect the stem 113 to this diaphragm 100. The lower portion of the stem 113 extends through a second diaphragm follower plate 117 and receives in screw-threaded engagement therewith a nut 118 whereby the inner periphery of the diaphragm 99 is clamped between the lower end of the diaphragm follower 116 and diaphragm follower plate 117 to operatively connect the valve stem 113 to this diaphragm 99.

Above the collar 114, the stem 113 is provided with two identical spaced-apart peripheral annular grooves in each of which is disposed an O-ring seal 119 that forms a seal with the wall surface of the bore 105 to prevent leakage of fluid under pressure between the periphery of the valve stem 113 and the wall surface of the bore 105, and from the chambers 101 and 108 to the atmospheric chamber 109.

The valve step 113 is provided with a bottomed bore 120 and a crossbore 121 the opposite ends of which open onto an elongated peripheral annular groove 122 formed on the stem 113 intermediate the two O-ring seals 119 carried thereon. The groove 122 is so located that, while the stem 113 occupies a position in which a flat disc-type valve 123 disposed in the chamber 106 is seated on an annular valve seat 124 by a spring 125 interposed between the valve 123 and cover member 107, and the upper end of this stem 113 is disposed below the lower side of the valve 123, the pressure chamber in the brake cylinder 9a is open to atmosphere via a pipe and corresponding passageway 126 that extends through the pipe bracket 92 and casing section 97 to the chamber 108, ports 110, bore 105, bottomed bore 120, crossbore 121, groove 122, ports 111, chamber 109 and strainer device 112.

The chamber 106 is supplied with fluid under pressure from the brake cylinder port of the brake control valve 1 via the brake cylinder pipe 12 and a passageway 127 extending through the pipe bracket 92 and casing section 97 when the brake control valve 1 is operated to its service or emergency position to supply fluid under pressure from, respectively, the oversize auxiliary reservoir 3a or from both the oversize auxiliary reservoir 3a and the first and second emergency reservoirs 4 and 90. The valve 123 thus controls communication between the chamber 106, to which fluid under pressure is supplied by operation of the brake control valve 1 to its service or emergency position, and the interior or bore 105 from which fluid under pressure may flow to the brake cylinder 9a via ports 110, chamber 108 and passageway and pipe 126. The outer periphery of the smaller diaphragm 99 is clamped between the casing 98 and a second cover member 128 which is secured to the casing section 98 by any suitable means (not shown). The diaphragm 99 cooperates with the second cover member 128 to form below this diaphragm a chamber 129 that is connected to the hereinbefore-mentioned passageway 127 in the pipe bracket 92 by a passageway 130 extending through the bottom cover member 128, casing sections 98 and 97, and pipe bracket 92.

A spring 131, which is stronger than the spring 125, disposed in the chamber 129, is interposed between the second cover member 128 and the diaphragm follower plate 117 for normally biasing the diaphragm follower plate 115 against a stop 132 that is integral with the casing section 97 and extends into the chamber 101 to thereby determine the uppermost position to which the stem 113 can be moved by this spring 131. In this uppermost position of the stem 113, its upper end unseats the valve 123 from its seat 124 to normally establish a communication between the brake cylinder port of the brake control valve 1 and the brake cylinder 9a via pipe 12, passageway 127, chamber 106, bore 105, ports 110, chamber 108, and passageway and pipe 126.

In the second embodiment of the invention shown in FIG. 2 of the drawings, one end of the pipe 54 is connected to the passageway 53 in the load-sensing mechanism 10, as shown in FIG. 3, and the opposite end is connected to one end of a passageway 133 in the pipe bracket 92. As shown in FIG. 2, the hereinbefore-mentioned choke 56 is disposed in the upper left-hand end of that portion of passageway 103 that is in the pipe bracket 92. As in the first embodiment of the invention, the choke 56 serves to control the rate of flow of fluid under pressure to or the rate of build-up of pressure in the chamber 101 in the change-over valve device 91.

Also, in the second embodiment of the invention shown in FIG. 2, one end of the pipe 58 is connected to the passageway 57 in the load-sensing mechanism 10, as shown in FIG. 3 and the other end is connected to the hereinbefore-mentioned pipe 126 intermediate the ends thereof.

OPERATION—FIG. 2

Initial charging

The empty and load fluid pressure brake equipment shown in FIG. 2 is initially charged in the same manner as hereinbefore described for the brake equipment shown in FIG. 1.

It will be understood that at this time the brake cylinder 9a and the various chambers in the change-over valve device 91 and the load-sensing mechanism 10 are devoid of fluid under pressure.

Service application of the brakes on an empty vehicle

When it is desired to effect a partial service application of the brakes on an empty vehicle, the pressure in the brake pipe 2 will be reduced in the usual manner to a lower pressure corresponding to the degree of brake application desired by operation of the brake valve on the locomotive to cause the service portion 11 of the brake control valve 1 to effect the supply of fluid under pressure from the oversize auxiliary reservoir 3a to the pipe 12, passageway 127 and chamber 106 and establish therein a pressure corresponding to the degree of reduction of pressure effected in the brake pipe 2.

Some of the fluid under pressure thus supplied to the passageway 127 flows therefrom to the chamber 129 via the passageway 130. This fluid under pressure supplied to the chamber 129 acts in an upward direction of the effective area of the smaller diaphragm 99 it being noted that, as hereinbefore stated, the spring 131 alone is effective to move the valve stem 113 and follower plate 115 upward to the position shown in FIG. 2 in which this plate 115 abuts the stop 132. Upon this movement of the stem 113 upward to the position shown in FIG. 2, its upper end is first moved into abutting relationship with the lower side of the flat disc valve 123 to close communication between the brake cylinder 9a and atmosphere via pipe and passageway 126, chamber 108, ports 110, bore 105, bottomed bore 120, crossbore 121, groove 122, ports 111, chamber 109, and strainer device 112. Further upward movement of the stem 113 is effective to unseat valve 123 from its seat 124 against the yielding resistance of the spring 125.

Since the valve 123 is unseated from its seat 124, the fluid under pressure supplied to the chamber 106, in the manner explained above, flows from this chamber 106 to the pressure chamber of the brake cylinder 9a and the interior of the counter bore 43 (FIG. 3) past the unseated valve 123 and thence via the bore 105, ports 110, chamber 108, passageway and pipe 126, pipe 58 and passageway 57.

Fluid under pressure thus supplied to the interior of the counterbore 43 acts on the left-hand face of the piston 64 to move this piston in the direction of the right hand against the yielding resistance of the spring 86 to effect via piston rod 74 counterclockwise rocking of the lever 79 about the pin 81 until the foot 85 is moved into abutting relationship with the stop 20. Since the vehicle may be assumed to be empty, the foot 85 is at a maximum distance from the stop 20. Therefore, the piston 64 is moved in the direction of the right hand until the left-hand end of the elongated slot 62 in the hollow boss 63 abuts the pin 61 without moving the spool valve 44 from the position shown in FIG. 3. Subsequent to movement of the left-hand end of the slot 62 into abutting relationship with the pin 61, further movement of the piston 64 in the direction of the right hand is effective to move the spool valve 44 in this direction from the position shown in FIG. 3 to a position in which the O-ring seal 47 adjacent the right-hand end of the groove 46 on spool valve 44 forms a seal with the wall surface of the bottomed bore 42 at a location on the right-hand side of the location at which the ports 59 open at the wall surface of this bottomed bore, and the O-ring seal 47 adjacent the left-hand end of this groove 46 forms a seal with the wall surface of the bottomed bore 42 at a location on the left-hand side of the location at which the lower end of the passageway 53 opens at the wall surface of this bottomed bore 42. Accordingly, it will be understood that in this empty position of the spool valve 44, the groove 46 thereon is effective to establish a communication between the passageways 57 and 53. Therefore, fluid under pressure supplied to the passageway 57 in the manner described above will now flow to the chamber 101 in the change-over valve device 91 via ports 59, groove 46, passageway 53, pipe 54, passageways 133 and 103 and choke 56 it being noted that some of the fluid under pressure thus supplied to the passageway 103 flows therefrom into the volume reservoir 95.

It will be understood from the foregoing that the fluid under pressure supplied from the oversize auxiliary reservoir 3a to the brake cylinder pipe 12 by operation of the service portion 11 of the brake control valve 1 flows to the chamber 106 in the change-over valve device 91 and thence to the large volume brake cylinder 9a, the volume reservoir 95 and chamber 101, it being noted that the rate of flow of fluid under pressure to this chamber 101 is controlled by the size of the choke 56. The effective area of the diaphragm 100 is greater than the effective area of the diaphragm 99, as hereinabove stated. Consequently, the fluid under pressure present in the chamber 101 acts on a greater area than the fluid under pressure present in the chamber 129. Therefore, the fluid pressure force acting downward on the larger diaphragm 100 will increase more rapidly than the fluid pressure force acting upward on the smaller diaphragm 99. Accordingly, for a given pressure present in the chamber 129, a lesser pressure depending on the effective area of the diaphragms 99 and 100, present in the chamber 101 will establish a fluid pressure force acting in a downward direction that exceeds the fluid pressure force acting in an upward direction as the result of the above-mentioned given pressure in the chamber 129, and, if the pressure present in the chamber 129 remained constant, the diaphragm stack including the diaphragms 99 and 100 and the valve stem 113 would move downward until the spring 125 seated the valve 123 on its seat 124 which would cut off further flow of fluid under pressure to the brake cylinder 9a, volume reservoir 95 and chamber 101. However, the pressure in the chamber 129 is increasing and continues to increase until the pressure in the pipe 12, brake cylinder 9a, volume reservoir 95 and chamber 129 corresponds to the degree of reduction of pressure effected in the brake pipe 2. This increasing pressure in the chamber 129 is effective to correspondingly increase the fluid pressure force acting upward on the diaphragm 99. Therefore, this increasing fluid pressure force acting upward on the diaphragm stack and stem 113 maintains this stem in its upper position shown in FIG. 2 in which valve 123 is unseated from its seat 124 so that fluid under pressure can continue to flow to the brake cylinder 9a, volume reservoir 95 and chamber 101. Accordingly, the pressure in the pipe 12 and chambers 129 and 106 will increase until it reaches a value corresponding to the reduction of pressure effected in the brake pipe 2. Since the valve 123 is unseated from its seat 124, fluid under pressure will flow from the chamber 106 to the brake cylinder 9a, volume reservoir 95 and chamber 101 until the pressure of the fluid present in the chamber 101 and acting downward on the effective area of the larger diaphragm 100 establishes a fluid pressure force that slightly exceeds the fluid pressure force acting in an upward direction on the smaller diaphragm 99 as the result of the greater degree of pressure present in the chamber 129, it being noted that the pressure in the chamber 129 corresponds to the reduction of pressure effected in the brake pipe 2, as stated above. Consequently, subsequent to the build-up of pressure in the chamber 129 to the value corresponding to the degree of reduction of pressure effected in the brake pipe 2, a lesser pressure established in the brake cylinder 9a, volume reservoir 95 and chamber 101 will move the diaphragm stack including diaphragms 99 and 100 and stem 113 downward thereby rendering spring 125 effective to seat valve 123 on its seat 124 to cut off further flow of fluid under pressure from the brake cylinder pipe 12, passageway 127 and chamber 106 to the brake cylinder 9a, volume reservoir 95 and chamber 101.

If now a greater degree of pressure is desired in the brake cylinder 9a, a further reduction of pressure in the brake pipe 2 is effected by operation of the brake valve on the locomotive until the pressure in the brake pipe 2 is decreased an amount corresponding to the degree of brake application desired.

The brake control valve 1 operates in response to this further reduction of pressure in the brake pipe 2 to effect the supply of fluid under pressure from the oversize auxiliary reservoir 3a to the pipe 12, passageway 127 and chamber 129 to increase the pressure therein an amount corresponding to the further reduction of pressure effected in the brake pipe. As the pressure in the chamber 129 is thus increased, the change-over valve device 91 will operate in the same manner as hereinbefore described to effect a further increase of pressure in the large volume brake cylinder 9a to a value proportionally less than that established in the pipe 12, passageway 127 and chamber 129 by operation of the service portion 11 of the brake control valve 1.

From the foregoing, it is apparent that as the pressure in the brake pipe 2 is decreased to that required to normally effect a full service brake application, the change-over valve device 91 operates, in a manner similar to the operation of the proportional valve device 5, to effect a corresponding increase in the pressure obtained in the brake cylinder 9a which pressure is less than that established in pipe 12, passageway 127 and chamber 129 by operation of the service portion 11 of the brake control valve 1 by an amount dependent on the difference in the effective areas of the diaphragms 100 and 99.

Accordingly, it will be understood that by the proper selection of the capacity of the volume reservoir 95 and the effective area of the diaphragms 100 and 99, the diaphragm stack and stem 113 will move downward to render spring 125 effective to seat valve 123 on its seat 124 upon the pressure in the brake cylinder 9a reaching the value required to provide a braking force that is adequate to brake an empty vehicle.

It will be noted that when a brake application is made, fluid under pressure is supplied from the oversize auxiliary reservoir 3a to the brake cylinder device 9a, volume reservoir 95 and the chambers 101 and 129 in the change-over valve device 91 until pressure in the chamber 101 establishes a fluid pressure force acting in a downward direction on the effective area of the larger diaphragm 100 that exceeds the fluid pressure force acting in an upward direction on the effective area of the smaller diaphragm 99 as the result of the pressure present in the chamber 129. Accordingly, the volume of this reservoir 95 and the size of the choke 56 that controls the rate of flow of fluid under pressure to the chamber 101 are so selected as to prevent too rapid a build-up of pressure in the chamber 101 or, in other words to insure that the volume of the chamber 101 and reservoir 95 is substantially the same as the volume of the brake cylinder 9a so that the rate of pressure build-up in this cylinder 9a, volume reservoir 95, and chamber 101 will be the same.

While the brakes are applied on an empty vehicle, as has been stated above, the spool valve 44 occupies a position to the right of that shown in FIG. 3 in which position the groove 46 thereon establishes a communication between the passageways 57 and 53. Furthermore, the piston 64 is in a position in which the left-hand end of the slot 62 abuts the pin 61, and the foot 85 is in abutting relationship with the stop 20, as aforestated.

Accordingly, should any relative movement between the sprung and unsprung parts of the railway vehicle now occur as the result of shocks, jolts, etc., a limited amount of clockwise or counterclockwise rocking of the lever 79, as explained in detail in connection with the first embodiment of the invention, will not move the spool valve 44 to a position to close communcation between the passageways 57 and 53.

Release of a service application on an empty vehicle

When it is desired to effect a release of a service brake application, the pressure in the brake pipe 2 will be increased in the usual manner to cause the slide valve of the service portion 11 of the brake control valve 1 to be returned to its release position to connect pipe 12, passageways 127 and 130 and chambers 106 and 129 to atmosphere via a pathway hereinbefore described.

As fluid under pressure is thus vented from the chamber 106, it is likewise vented from the upper side of check valve 123 which is seated on its seat 124. Consequently, as fluid under pressure is vented from chamber 106 and the upper side of valve 123, the fluid under pressure present in the bore 105, chamber 108, passageway and pipe 126, brake cylinder 9a, volume reservoir 95 and chamber 101 will move the valve 123 upward from its seat 124 against the yielding resistance of spring 125 it being noted that the pressure in the chamber 101 and acting in a downward direction on the effective area of the diaphragm 100 maintains the diaphragm stack and stem 113 in their lower position upon the initial unseating of valve 123 from its seat 124.

Upon unseating of the valve 123 in the manner just explained, fluid under pressure in the chamber 101, volume reservoir 95 and brake cylinder 9a will be vented to atmosphere via the service slide valve of the service portion 11, it being noted that fluid under pressure is simultaneously released from chamber 129 to atmosphere. Consequently, it is apparent that the spring 131 returns the parts of the change-over valve device 91 to the position shown in FIG. 2 and all fluid under pressure is released from chambers 101 and 129, volume reservoir 95 and brake cylinder 9a thereby completely releasing the brakes on the empty vehicle.

Since fluid under pressure is simultaneously released from the interior of the counterbore 43 (FIG. 3), the parts of the load-sensing mechanism 10 are returned to the position shown in FIG. 3 in the same manner as explained in detail for the first embodiment of the invention and hence need not be repeated.

Service application of the brakes on a loaded vehicle

The operation of the brake control valve device 1 and the load-sensing mechanism 10 is the same as that hereinbefore described for the first embodiment of the invention. Therefore, it will be understood that fluid under pressure supplied to the brake cylinder pipe 12 by operation of the service portion 11 of brake control valve 1 flows to the chambers 129 and 106. Since the force of spring 131 maintains the diaphragm stack and the stem 113 in the position shown in FIG. 2 in which this stem unseats valve 123 from its seat 124, the fluid under pressure supplied from the oversize auxiliary reservoir 3a to the chamber 106 flows therefrom to the brake cylinder 9a of large volume past unseated valve 123, and thence via bore 105, ports 110, chamber 108 and passageway and pipe 126, it being understood that the spool valve 44 remains in the position shown in FIG. 3 so that not fluid under pressure is supplied to the volume reservoir 95 and the chamber 101 in the change-over valve device 91. Consequently, fluid under pressure will flow from the pipe 12 to the brake cylinder 9a until the service slide valve of the service portion 11 of brake control valve 1 is moved to its lap position in the usual manner to cut off flow of fluid under pressure from the auxiliary reservoir 3a to the brake cylinder 9a. Accordingly, it is apparent that the pressure obtained in the brake cylinder 9a corresponds to the reduction of pressure effected in the brake pipe 2 and that a greater braking force is provided for the vehicle while loaded than is provided while it is empty.

It may be noted that operation of the load-sensing mechanism 10 in response to shocks, jolts, etc. occurring while the brakes are applied on a loaded vehicle is the same as hereinbefore described for the first embodiment of the invention and therefore need not be repeated.

Release of a service application of brakes on a loaded vehicle

A release of a service application on a fully loaded vehicle is effected in the same manner as hereinbefore described for the first embodiment of the invention, it being noted that upon return of the service slide valve of the service portion 11 to its release position, all fluid under pressure is released from the brake cylinder 9a to atmosphere via pipe and passageway 126, chamber 108, ports 110, bore 105, chamber 106, passageway 127, pipe 12, the service slide valve of service portion 11, pipe 17 and retaining valve device 18 which it may be assumed occupies its direct exhaust position.

Emergency application and release of brakes

An emergency brake application on both an empty and a loaded vehicle provided with the brake equipment shown in FIG. 2 differs from a service brake application in the same manner as hereinbefore described for the first embodiment of the invention except that upon effecting an emergency brake application, fluid under pressure is supplied from the oversize auxiliary reservoir 3a, the first emergency reservoir 4 and the second emergency reservoir 90 to the large volume brake cylinder 3a to provide therein a higher brake cylinder pressure that is obtained upon effecting a service brake application.

The release of an emergency brake application on either an empty or a loaded vehicle is identical to the release of a service brake application, except that when effecting a brake release subsequent to an emergency brake application, the first emergency reservoir 4 and the second emergency reservoir 90 are also recharged from the brake pipe 2 to substantially the pressure carried therein.

Having now described the invention what I claim as new and desire to secure by Letters Patent is:

1. In an empty and load fluid pressure brake equipment for a vehicle having a sprung part and an unsprung part, the combination of:
 (a) a brake pipe normally charged with fluid under pressure,
 (b) a reservoir normally charged to the pressure in said brake pipe,
 (c) braking means for effecting a brake application,
 (d) a fluid pressure responsive brake control valve operative in response to variations in the pressure in said brake pipe to control the supply of fluid under pressure from said reservoir to said braking means to cause a brake application,
 (e) a differential abutment means,
 (f) valve means operable by said differential abutment means in response to the establishment of a first differential fluid pressure force acting in one direction on said abutment means to open a communication through which said brake control valve effects the supply of fluid under pressure from said reservoir to said braking means, and operable in response to the establishment of a second differential fluid pressure force in excess of said first differential fluid pressure force and acting in an opposite direction on said abutment means to close said communication,
 (g) one-way valve means operable to control flow of fluid under pressure from said braking means to said brake control valve,
 (h) stop means carried by the unsprung part of the vehicle, and
 (i) load-sensing means including a lever having one end pivotally mounted on the sprung part of the vehicle and the other end rockable into abutting contact with said stop means, to provide, only while the vehicle is loaded, a first position of said load-sensing means in which said first differential fluid pressure force is established on said abutment means, and to provide, only while the vehicle is empty, a second position of said load-sensing means in which said second differential fluid pressure force is established on said abutment means.

2. An empty and load fluid pressure brake equipment, as recited in claim 1, further characterized in that said differential abutment means comprises a pair of abutments of unequal effective area, the abutment having the smaller effective area being aways subject to the fluid under pressure supplied from said reservoir upon operation of said brake control valve independently of the position of said load-sensing means and the abutment having the larger effective area being subject to fluid under pressure only while said load-sensing means occupies its said second position.

3. An empty and load fluid pressure brake equipment, as recited in claim 2, further characterized by a volume reservoir, said volume reservoir and said abutment having the larger effective area being simultaneously supplied with fluid under pressure only while said load-sensing means occupies its said second position whereby said volume reservoir is effective to control the rate of establishment of said second differential fluid pressure force.

4. An empty and load fluid pressure brake equipment, as recited in claim 2, further characterized by a volume reservoir and by a choke for controlling the rate of flow of fluid under pressure said abutment having the larger effective area, said abutment being supplied with fluid under pressure via said choke only while said load-sensing means occupies its said second position whereby said volume reservoir and said choke cojointly are effective to control the rate of establishment of said second differential fluid pressure force to prevent premature closing of said communication upon effecting an emergency brake application.

5. An empty and load fluid pressure brake equipment, as recited in claim 2, further characterized by a volume reservoir supplied with fluid under pressure only while said load-sensing means occupies its said second position to control the rate of establishment of said second differential fluid pressure force to prevent premature closing of said communication upon effecting a brake application.

6. An empty and load fluid pressure brake equipment, as recited in claim 1, further characterized in that said valve means comprises a valve seat and a valve, said valve being movable by and with respect to said differential abutment means whereby said valve is movable by said abutment means out of seating contact with said seat to open said communication upon the establishment of said first differential fluid pressure force on said abutment means, and into seating contact with said seat to close said communication upon the establishment of said second differential fluid pressure force, said valve being movable relative to and independent of said abutment means to constitute said one-way valve means.

7. An empty and load fluid pressure brake equipment, as recited in claim 6, further characterized by stop means carried by said differential abutment means for limiting movement of said valve in one direction with respect to said abutment means, and by biasing means interposed between said differential abutment means and said valve for normally biasing said valve against said stop means and yieldingly resisting movement of said valve away from said stop upon movement of said valve way from said seat independently of movement of said differential abutment means with respect to said seat.

8. An empty and load fluid pressure brake equipment, as recited in claim 1, further characterized by biasing means establishing a force that acts on said differential abutment means in a direction to render said differential abutment means ineffective to cause said valve means to close said communication prior to the establishment of a chosen pressure in said braking means.

9. An empty and load fluid pressure brake equipment, as recited in claim 1, further characterized in that said load-sensing means comprises:
   (a) two-position valve means having a first position for closing a communication to cause the establishment of said first differential fluid pressure force, and a second position for opening said communication to cause the establishment of said second differential fluid pressure force,
   (b) a piston subject on one side to the fluid under pressure supplied to said braking means and operably connected to said pivoted lever for effecting rocking thereof, and
   (c) a mechanical linkage providing a lost-motion connection between said valve means and said piston to enable limited rocking of said lever while said valve means occupies either of its positions without effecting movement of said valve means out of its respective position, and movement of said valve means by said piston subsequent to said limited rocking of said lever.

10. An empty and load fluid pressure brake equipment, as recited in claim 9, further characterized in that said mechanical linkage, while said vehicle is loaded, provides for rocking said other end of said lever by said piston into abutting contact with said stop means without effecting movement of said valve means out of its said first position, and while said vehicle is empty, provides for effecting movement of said valve means from its said first position to its said second position upon rocking of said other end of said lever by said piston into abutting contact with said stop means.

11. An empty and load fluid pressure brake equipment, as recited in claim 9, further characterized by means for balancing said valve means in each of its two positions.

12. An empty and load fluid pressure brake equipment, as recited in claim 9, further characterized in that said valve means comprises a spool-type valve having a passageway extending therethrough whereby said valve is balanced by subjecting its opposite ends to the same pressure.

13. An empty and load fluid pressure brake equipment, as recited in claim 1, further characterized in that said differential abutment means comprises:
   (a) a diaphragm,
   (b) a cup-shaped piston having at its closed end a flange disposed in abutting relationship with one side of said diaphragm, the effective area of which exceeds the area of said piston whereby said diaphragm and said piston constitutes said differential abutment means.

14. An empty and load fluid pressure brake equipment, as recited in claim 1, further characterized in that said differential abutment means comprises two connected diaphragms of unequal effective area, the diaphragm having the smaller effective area being always subject to the fluid under pressure supplied from said reservoir upon operation of said brake control valve, and diaphragm having the larger effective area being subject to fluid under pressure only while said load-sensing means occupies its said second position.

15. An empty and load fluid pressure brake equipment, as recited in claim 1, further characterized in that said valve means is always operable independently of said load-sensing means to control the flow of fluid under pressure from said braking means and operable cojointly with said load-sensing means while the vehicle is empty to control the flow of fluid under pressure to cause the establishment and disestablishment of said second differential fluid pressure force, said valve means being operable by said differential abutment means to cut off flow of fluid under pressure to said braking means and to terminate the establishment of said second differential abutment means as said one-way valve means to said brake control valve and to disestablish said second differential fluid pressure force.

16. In an empty and load fluid pressure brake equipment for a vehicle having a sprung part and an unsprung part, the combination of:
   (a) a brake pipe normally charged with fluid under pressure,
   (b) a fluid pressure storage reservoir normally charged to the pressure in said brake pipe,
   (c) braking means for effecting a brake application,
   (d) a fluid pressure responsive brake control valve operative in response to variations in the pressure in said brake pipe to control the supply of fluid under pressure from said storage reservoir to said braking means to cause a brake application, wherein the improvement comprises:
   (e) a proportional valve device interposed between said brake control valve and said braking means to proportion according to the load on the vehicle the pressure developed in said braking means in response to fluid under pressure supplied from said storage reservoir by operation of said control valve, said proportional valve device comprising:
      (i) a casing having a bore provided with a valve seat at one end and a coaxial counterbore to one end of which fluid under pressure is supplied by said brake control valve,
      (ii) an annular cup-shaped piston element sealably and slidably mounted in said counterbore and subject at its open end to the fluid under pressure supplied to said counterbore,
      (iii) a valve coaxial with said seat and movably mounted in said cup-shaped piston element, said valve being cooperable with said seat to control flow of fluid under pressure from said one end of said counterbore in said casing to said braking means,
      (iv) a stop for said valve carried by said cup-shaped piston element,
      (v) biasing means interposed between said piston element and said valve for biasing said valve in the direction of said stop and also said seat whereby in one position of said piston element said valve abuts said stop and seats on said valve seat to close communication from said one end of said counterbore to said braking means, said valve being movable away from said seat against the yielding resistance of said biasing means upon the pressure in said braking means exceeding that in said counterbore to open said communication, and in another position of said piston element said valve abuts said stop and is unseated from said valve seat, and
      (vi) a movable abutment having a greater effective area than said piston element, one side of said abutment abutting one end of said piston element and the other side cooperating with said casing to form a chamber,
   (f) stop means carried by the unsprung part of the vehicle, and (g) load-sensing means including a lever having one end pivotally mounted on the sprung part of the vehicle and the other end rockable into abutting contact with said stop means, to provide only while the vehicle is loaded, a first position of said load-sensnig means in which a communication is closed between said braking means and said chamber at said other side of said abutment whereby fluid under pressure supplied to said one end of said counterbore is effective only on said cup-shaped piston element to maintain it in its said other position in which said valve is unseated from said valve seat, and to provide, only while the vehicle is empty, a second position of said load-sensing means in which said communication between said braking means and said chamber is open to provide for flow of fluid under pressure from said braking means to said chamber until this fluid under pressure acting in one direction on the greater effective area of said abutment establishes a fluid pressure force acting in said one direction on said piston element that exceeds the fluid pressure force established by the fluid under pressure present in said counterbore and acting in an opposite direction on said piston element whereupon said piston element is moved to its said one position in which said valve is seated on said valve seat.

References Cited

UNITED STATES PATENTS

| | | | |
|---|---|---|---|
| 1,720,284 | 7/1929 | Maliphant | 303—22 R |
| 3,169,802 | 2/1965 | Chovan | 303—23 R |
| 3,376,080 | 4/1968 | Kettering et al. | 303—22 R |
| 3,606,485 | 9/1971 | Scott | 303—23 R |

DUANE A. REGER, Primary Examiner

U.S. Cl. X.R.

303—22 R

PO-1050
(5/69)

UNITED STATES PATENT OFFICE
CERTIFICATE OF CORRECTION

Patent No. 3,671,086                    Dated June 20, 1972

Inventor(s) Daniel G. Scott

It is certified that error appears in the above-identified patent and that said Letters Patent are hereby corrected as shown below:

Column 20, line 43, after "pressure" insert --to--

Column 21, line 72, after "and" insert --the--

Column 22, line 12, after "differential" insert --fluid pressure force operable independently of said differential-- line 13, after "means", second occurrence, insert --to control flow of fluid under pressure from said braking means--

Signed and sealed this 30th day of January 1973.

(SEAL)
Attest:

EDWARD M. FLETCHER, JR.
Attesting Officer

ROBERT GOTTSCHALK
Commissioner of Patents